United States Patent

[11] 3,622,807

[72] Inventors Fernand D. Gillet;
Philipe Gransart, both of Bruxelles, Belgium
[21] Appl. No. 878,073
[22] Filed Nov. 19, 1969
[45] Patented Nov. 23, 1971
[73] Assignee Burroughs Corporation
Detroit, Mich.

[54] PULSE GENERATING SYSTEM FOR SYNCHRONIZING TERMINAL DATA FREQUENCY WITH COMMUNICATION LINE TRANSMISSION SPEED
3 Claims, 5 Drawing Figs.

[52] U.S. Cl. 307/265, 178/69.5, 307/269, 328/41, 328/63, 328/72, 328/74, 340/172.5
[51] Int. Cl. H03k 5/04
[50] Field of Search 307/265, 266, 269; 328/41, 42, 63, 72, 74; 178/69.5; 179/15; 340/172.5

[56] References Cited
UNITED STATES PATENTS
3,044,065 7/1962 Barney et al. 328/42 X
3,097,340 7/1963 Dobbie 307/265 X
3,500,375 3/1970 Klimo 328/74 X

*Primary Examiner*—John S. Heyman
*Assistant Examiner*—R. C. Woodbridge
*Attorneys*—Kenneth L. Miller and Edwin W. Uren

ABSTRACT: A pulse generating system generating a series of relatively low-speed or low-frequency pulses from a high-speed stable crystal oscillator, utilizes a 66-stage MOS shift register as a divisor. A second source of very high-frequency clock pulses provides a control of the pulse width of the several pulses within the pulse generating system. Disclosed herein are two systems which function in a similar manner and each are provided with suitable control members to control the generation of the lower frequency output pulses from the pulse generating system.

INVENTORS
FERNAND D. GILLET
PHILIPE GRANSART

BY Russell C. Wells
ATTORNEY

PULSE GENERATING SYSTEM FOR SYNCHRONIZING TERMINAL DATA FREQUENCY WITH COMMUNICATION LINE TRANSMISSION SPEED

CROSS-REFERENCE TO RELATED APPLICATION

Copending application entitled "Data Processing Terminal Unit," filed Nov. 19, 1969, Ser. No. 878,072, by Pedersen et al. and assigned to the same assignee as the present invention describes a data processor incorporating the pulse generating system herein.

SUMMARY OF INVENTION

A pulse generating system comprising a crystal oscillator as a source of a series of pulses at a very stable frequency, a pulse width generating means for changing the pulse width of the oscillator while maintaining the same pulse repetition rate, a counter and a second pulse width generating means for altering the pulse width output of the counter while maintaining a pulse repetition rate equal to the pulse rate of the counter. Operatively connected to the counter are means for controlling the output pulse generation of the pulse generating system.

DETAILED DESCRIPTION

Figure 1:
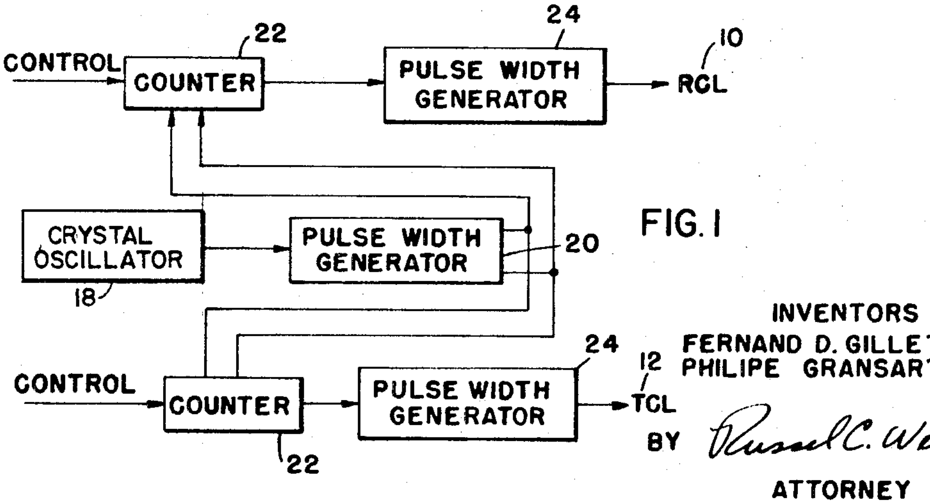
FIG. 1 is a block diagram of the pulse generating system.

The pulse generating system of FIG. 1 is in the preferred embodiment a timing system for synchronizing the flow of data from a data processor having a high processing speed with the data transmission rate of a data communication line. Such an environment is found in an online data processing system wherein a plurality of remote terminal units electronically communicate over telephone lines with a central computer.

The system of FIG. 1 is a redundant system for generating two individually controlled clock signals whereby one signal, RCL 10, is used to receive data from the telephone lines and a second signal, TCL 12, is used to transmit data to the telephone lines.

The basic timing clock pulse repetition time of the data processor is, in the preferred embodiment, 4.66 microseconds with a pulse width of approximately 500 nanoseconds. The transmission rate of the data communication lines is 147 baud wherein the pulse width is approximately 6.8 milliseconds. To achieve synchronization between the basic timing clock pulse and the speed of transmission, the RCL 10, receive clock signal, and TCL 12, transmit clock signal, are generated by the pulse generating system of FIG. 2.

For the purposes of illustration, the following voltage levels and circuit rules will be used:

a. A binary one signal is a true signal having a positive voltage level.

b. A binary zero signal is a false signal having a voltage level more negative than the binary one signal.

c. All flip flops are J–K flip flops and are positive trigger devices.

d. All AND gates are positive AND gates, that is each gate has a binary one output if all inputs are binary one.

Figure 5:
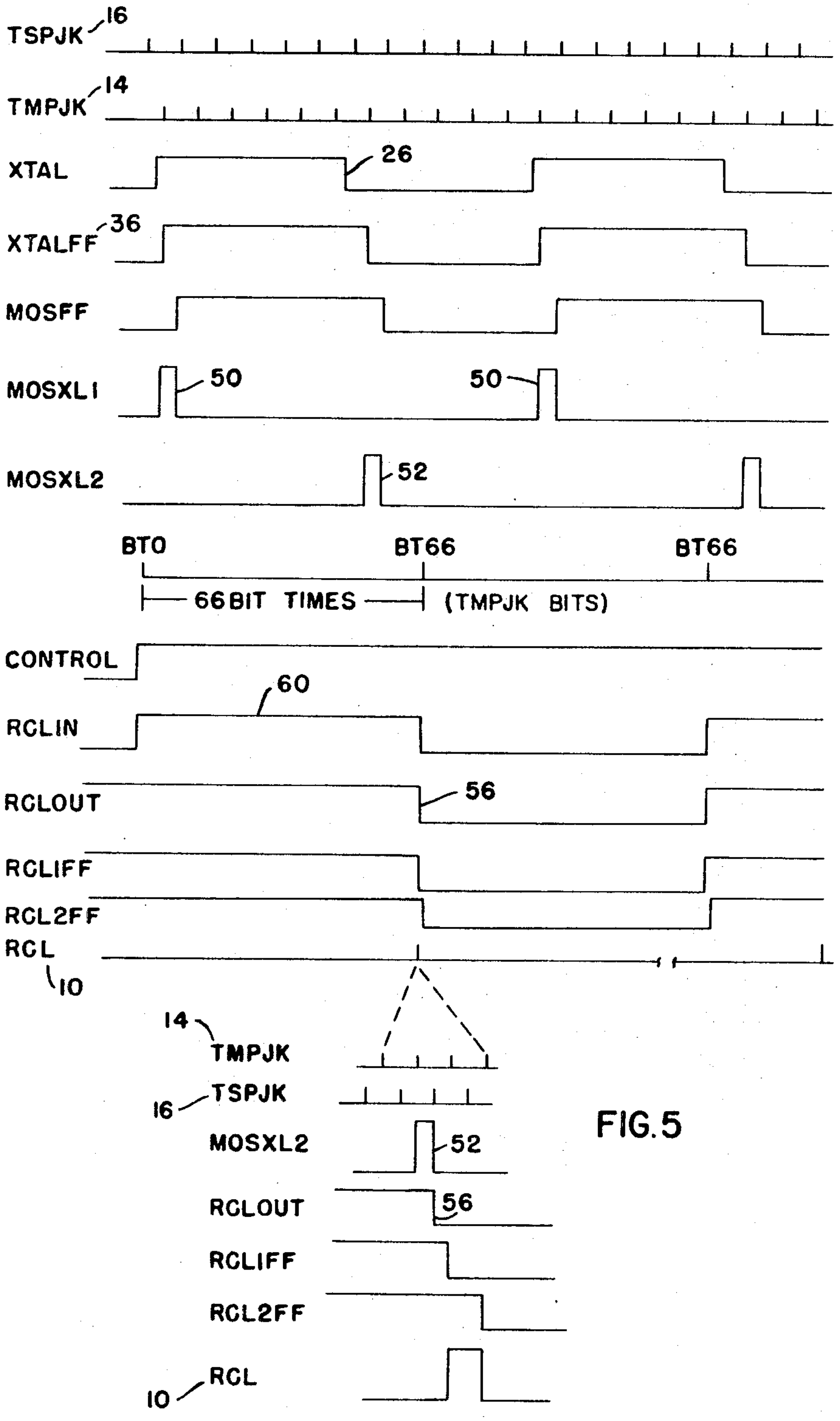
FIG. 5 is a timing diagram showing the generation of the pulses within the pulse generating system and the output pulses.

Referring to the timing diagram FIG. 5 there are shown the two basic timing signals; namely, TMPJK 14 and TSPJK 16. Each of these timing signals, as stated above, are 500 nanoseconds in width and spaced 4.66 microseconds apart in time. TSPJK 16 may be considered a slave pulse in that it is generated from the TMPJK 14 pulse and falls midway between successive TMPJK pulses. Thus the time between a TMPJK 14 pulse and a succeeding TSPJK 16 pulse is 2.33 microseconds.

The system for each clock, RCL 10 and TCL 12 comprise a crystal oscillator 18 as a source for developing a series of pulses at a very stable frequency, a first pulse width generating means 20 for changing the pulse width of the oscillator 18 while maintaining the same pulse repetition rate, a counter 22 and a second pulse width generating means 24 for changing the pulse width output of the counter while maintaining a pulse repetition rate equal to the pulse rate of the counter 22. Since a terminal unit is receiving and transmitting data at the same baud, the RCL 10 and TCL 12 pulses have the same basic timing dimensions although this is not a requirement of the system of FIG. 1.

In the preferred embodiment, the crystal oscillator 18 has a frequency of 19.36 kHz. which has a pulse cycle of 51.6 microseconds. As shown in the timing diagram of FIG. 5 the output signal XTAL 26 of the crystal, is a symmetrical square wave. This output, XTAL 26, is synchronized with the basic timing clock of the data processor by a J–K flip flop XTALFF 28. The output of the oscillator 18 is electrically connected to the J input 30 of the flip flop 28 and is also the output signal of the oscillator is inverted 32 and electrically connected to the K input 34 of the same flip flop. As shown in the timing diagram FIG. 5, the output of the oscillator 26 is asynchronous to the basic timing of the data processor and the output of the crystal flip flop XTALFF 28 is synchronized with the basic timing of the data processor. Therefore, the equations for the crystal flip flop XTALFF 28 are:

XTALFF=XTAL·TMPJK

XTALFF/=XTAL/·TMPJK

The usable pulse outputs XTALFF 36 and XTALFF/38 from the oscillator circuit are at the frequency of the oscillator which has a 5.1 microsecond pulse repetition time. However, each of these two outputs XTALFF 36 and XTALFF 38 must be decreased in pulse width while maintaining the same pulse repetition rate. This is accomplished by a second J–K flip flop called MOSFF 40 which is clocked by the TSPJK 16 signal. The equation for the outputs of this flip flop are:

MOSFF=XTALFF·TSPJK

MOSFF/=XTALFF/·TSPJK

Both of these outputs 42 and 44 have the same pulse time width as does the crystal flip flop 28; namely, 51.6 microseconds but each output is spaced from its corresponding crystal flip flop output XTALFF 36 or XTALFF/38 by the 2.3 microsecond interval between TMPJK and TSPJK. Therefore, the usable outputs are MOSXL1, and MOSXL2 which are generated in the two AND gates 46 and 48 according to the following equations:

MOSXL1=XTALFF·MOSFF/

MOSXL2=XTALFF/·MOSFF

Each signal MOSXL1 50 and MOSXL2 52 is a timing pulse having a pulse width of 2.3 microseconds and a pulse period equal to 51.6 microseconds. This is also illustrated in the timing diagram FIG. 5. The two AND 46 and 48 gates also function to space MOSXL2 52 midway between successive MOSXL1 50 pulses.

To achieve the correct pulse interval which is necessary for transmission of data over the telephone lines, the desired pulse repetition time of 6.8 milliseconds is divided by the pulse repetition time of oscillator circuit which is 51.6 microseconds, and a quotient of 132 resulted. Therefore, every 132nd pulse of the oscillator 18 must effectively be used to synchronize the data rate of the terminal unit with the data rate of the telephone lines. A 66 bit metal oxide semiconductor MOS shift recirculating register 54 and 55 is used as a counter 22 and with the appropriate control an output is generated every 3.4 milliseconds. The counter output 56 and 59 is further divided and the pulse width corrected to achieve the desired pulse width time of 4.3 microseconds at a pulse repetition time of 6.8 milliseconds to agree with the transmission data rate of the telephone lines.

RECEIVE CLOCK GENERATION

A clock signal 58, such as a power on signal for applying electronic power to the terminal unit, is used to initialize the counter by leaving each stage with a binary signal level equal to a count of zero. The construction of the shift register 54 and 55 in the preferred embodiment is such that by loading a binary one signal into the first stage of the shift register, 66 stages later this signal will appear at the 66th stage as a zero. Thus there is a signal inversion within the shift register 54 and 55 and therefore, by initializing the shift register to all zeros, the output of the shift register will have a binary one value for a time equal to 66 shifts. The preferred embodiment, the shift register also has a dual clocking signal system where a complete shift from one stage to the adjacent stage is completed after two clocking or shifting pulses. These clocking pulses are the MOSXL1 50 and MOSXL2 52 pulses.

The input to the shift register is defined by the following equation:

RCLIN 60=(RCLOUT·CONTROL)

where

CONTROL 62 = a timing signal for enabling the generation of output pulses according to a predetermined schedule.

RCLOUT 56 = is the output of the shift register. Therefore, until the CONTROL signal is switched to a binary one, the input to the shift register 54 is always false and the output remains constant. The above equation is implemented in the AND gate 64.

To process data from the telephone lines, the input data must be synchronized with the data processor when first received by the processor. In the preferred embodiment, this pulse generating system functions in a terminal unit which is an asynchronous unit. Information may be received at any time, therefore the RCL 10 clock must be turned on at the receipt of the start pulse which will cause the control signal to switch to binary one.

When CONTROL 62 goes true, the input to the shift register 54 goes true and 66 shifts later, the output level of the shift register RCLOUT 56 becomes false. At this time, with RCLOUT false, two functions of the system are initiated; namely, (1) the input 60 to the shift register is switched to binary zero and, (2) a second pulse width generator is activated.

The second pulse width generator 24 comprises two J–K flip flops RCL1 66 and RCL2 68 and an AND gate 70. Both flip flops 66 and 68 are clocked by TMPJK 14 and since they are electrically connected in series, the second flip flop RCL2 68 is delayed by the time period between successive TMPJK pulses. The AND gate 70 functions to control the time width of the RCL 10 and is defined by the following equation:

RCL=RCL1FF/·RCL2FF

The timing operation of the second pulse width generator 24 is illustrated in detail in FIG. 5.

As shown, the first RCL 10 pulse occurs after the first 66 shifts of the shift register 54 and then every second complete shift or 132 shifts later. In the preferred environment of an on-line data processing system, this places an RCL 10 pulse at the midpoint of each received data pulse.

Figure 3:
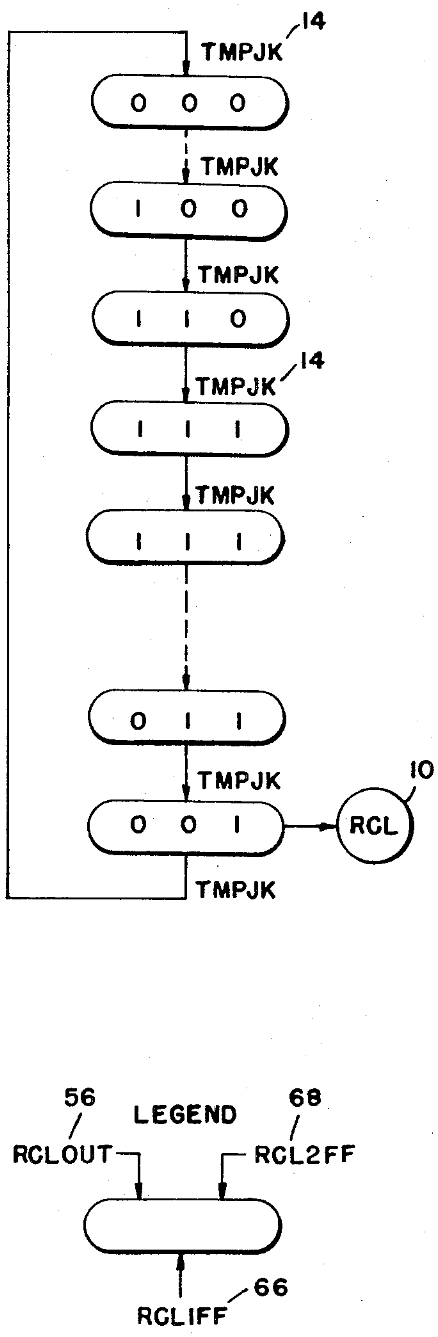
FIG. 3 is a state diagram.

FIG. 3 is the state machine diagram for the receive clock generation. The state machine is shown as the states of the output of the counter or shift register 54 and the outputs of the two J–K flip flops 66 and 68 of the second pulse width generator. The dashed connecting line between the state identified as 111 and the state identified as 011 and between the state identified as 000 and the state identified as 100 illustrates the 66 shifts or counts of the counter.

TRANSMIT CLOCK GENERATION

Figure 2:
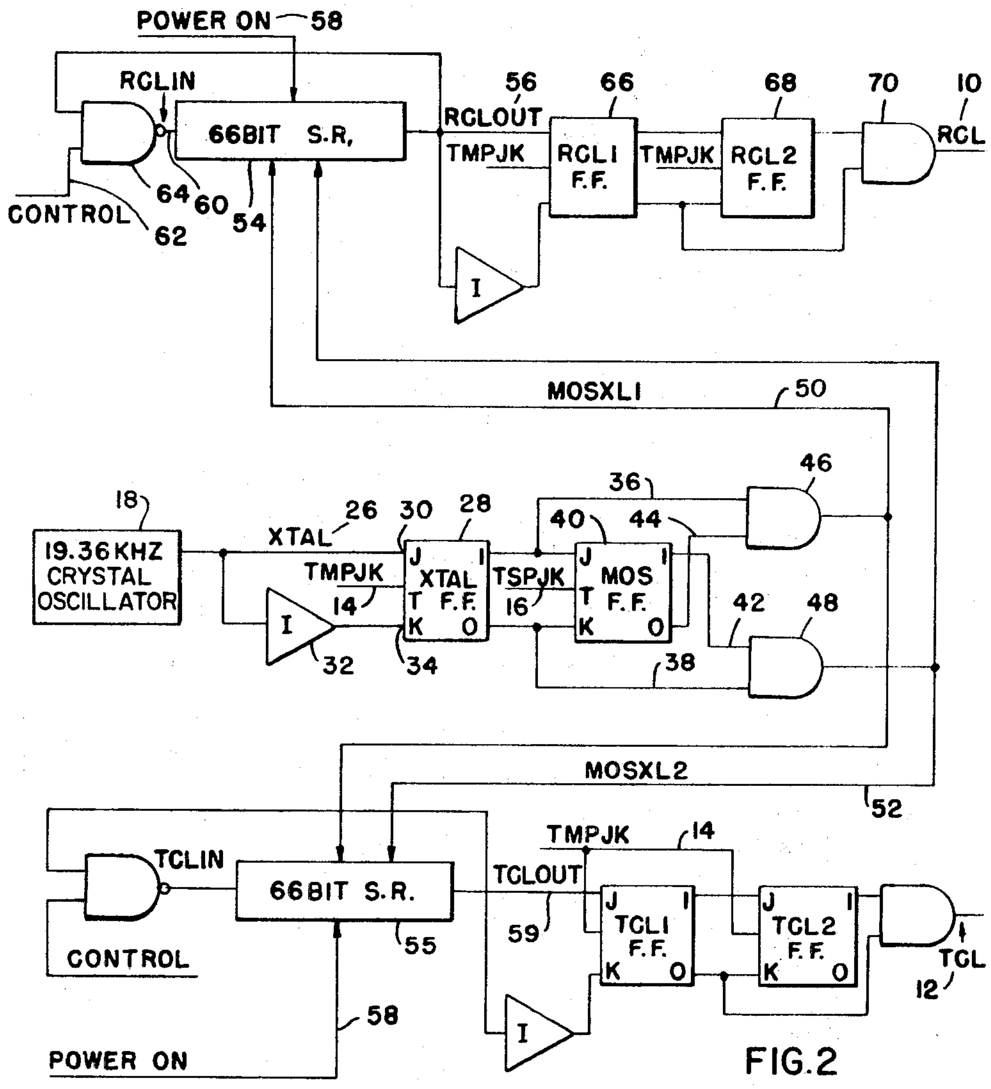
FIG. 2 is a logic diagram of the pulse generating system.

The transmit clock TCL 12 generation is accomplished in the same manner as the receive clock generator RCL 10. As illustrated in FIGS. 1 and 2 this is a redundant system and each clock may be separately controlled. In and between the state identified as 000 and the state identified by 100 illustrates the 66 transmit clock TCL 12 is a continuous running clock which synchronizes flow of data from the terminal unit to the transmission line. The terminal unit, during transmission, is the master control of the signals being transmitted and therefore the clock may be free running.

Figure 4:
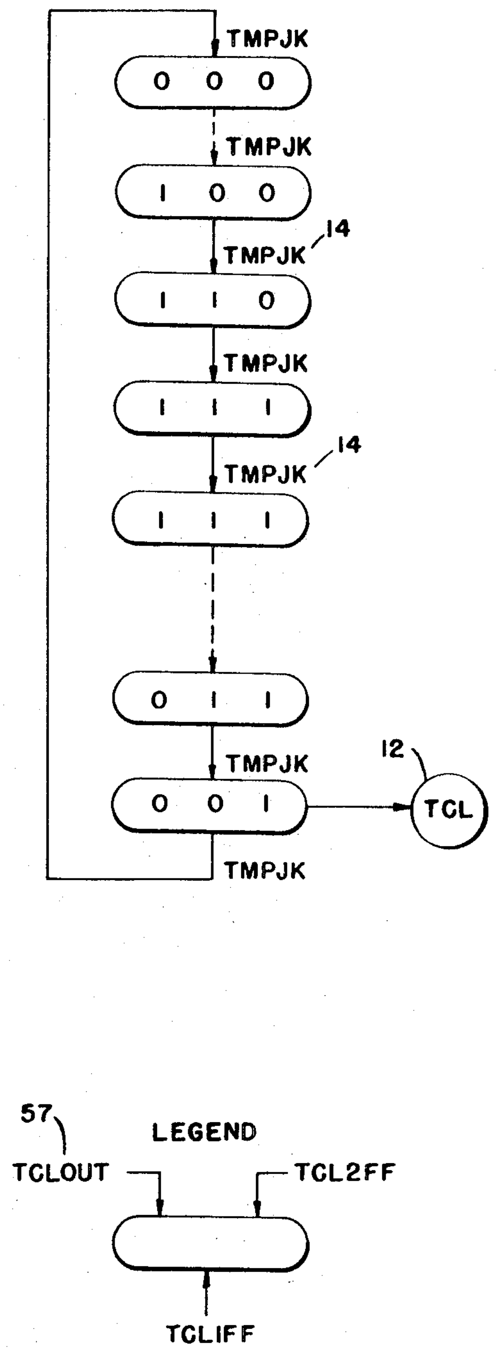
FIG. 4 is a state diagram.

The state diagram of FIG. 4 shows the binary status of the several signals in the TCL generation system and as in FIG. 3 the dashed line between the state identified as 111 and the state identified as 011 and between the state identified as 000 and the state identified by 100 illustrates the 66 shifts or counts of the counter.

Thus it can be seen that the clock can be started and stopped under electronic control by controlling the signals to the counter. Also the output of the clock can be varied by altering any of the constants of FIG. 2.

What is claimed is:

1. In a data communication terminal, a pulse generating system for synchronizing the transfer of data from or to the terminal with the speed of transmission of a communication channel, said system comprising:
   - a first source of high frequency first pulses wherein the pulse width time of each pulse is less than the pulse repetition time;
   - a second source of high frequency second pulses interposed in the spaced between successive pulses from said first source, said second pulse having a pulse width substantially identical to said first pulse;
   - a crystal oscillator for generating a plurality of symmetrical pulses at a frequency proportional to said source;
   - a first pulse width generator electrically connected to said oscillator comprising two serially connected bistable multivibrators the first of which is responsive to the first pulses from said first source and the second of which is responsive to said second pulses for generating a third pulse having a pulse width equal to the time between said first and second pulses and a pulse repetition rate equal to that of said symmetrical pulses;
   - a counter responsive to said third pulses and operable to generate a counter pulse signal after a predetermined number of pulses from said first pulse width generator; and
   - a second pulse width generator electrically connected to said counter and responsive to said first pulses for generating a plurality of fourth pulses having a pulse width equal to the time between successive first pulses and a pulse repetition rate equal to the transmission rate of the communication channel.

2. A pulse generating system according to claim 1 wherein said counter is a recirculating shifting register of n stages wherein an electrical output signal is generated after the number of register shifts equals 2n.

3. A pulse generating system according to claim 2 wherein the counter is a metal oxide semiconductor shift register having 66 stages and wherein each stage is shifted by two spaced apart third signals from said first pulse width generator.

* * * * *

PO-1050
(5/69)

UNITED STATES PATENT OFFICE
CERTIFICATE OF CORRECTION

Patent No. 3,622,807 Dated November 23, 1971

Inventor(s) Fernand D. Gillet and Philipe Gransart

It is certified that error appears in the above-identified patent and that said Letters Patent are hereby corrected as shown below:

Col. 2, line 35, change "5.1 microseconds" to --51.6 microseconds--.

Col. 4, delete lines 6 through 8 starting with "In and between" and ending with "66" and insert the following --In the preferred embodiment, the--.

Signed and sealed this 11th day of April 1972.

(SEAL)
Attest:

EDWARD M.FLETCHER,JR.
Attesting Officer

ROBERT GOTTSCHALK
Commissioner of Patents